Jan. 7, 1947. A. S. LISS ET AL 2,413,980
SHEARING APPARATUS
Filed Aug. 25, 1944 4 Sheets-Sheet 3
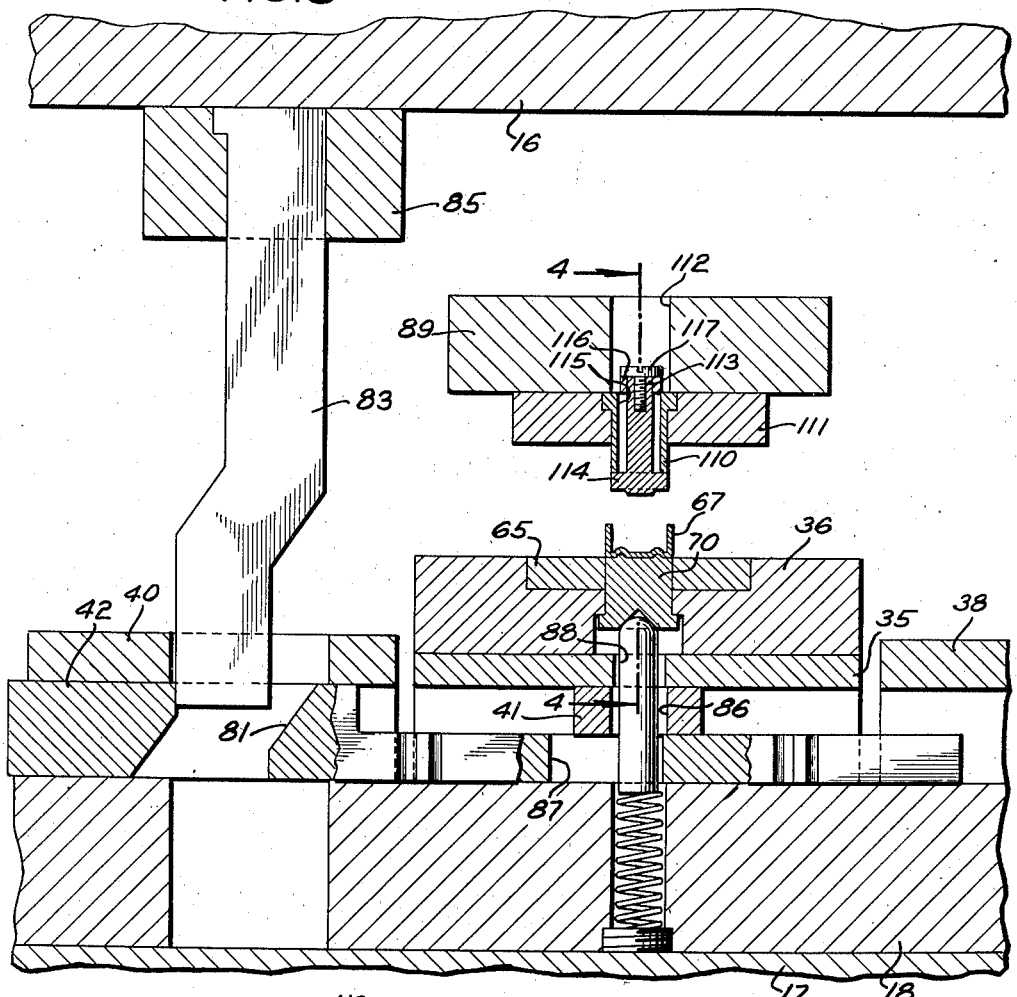
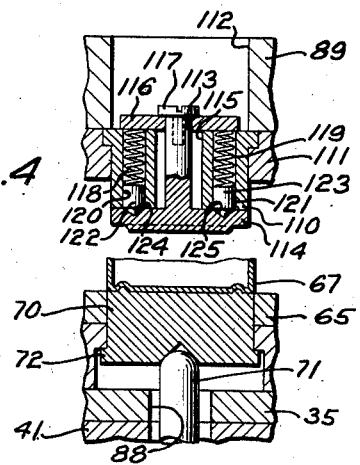
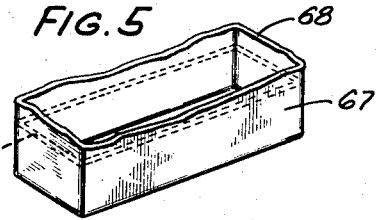
INVENTORS
A. S. LISS
A. M. MACPHEAT
BY
ATTORNEY Jan. 7, 1947.  A. S. LISS ET AL  2,413,980
SHEARING APPARATUS
Filed Aug. 25, 1944  4 Sheets-Sheet 4
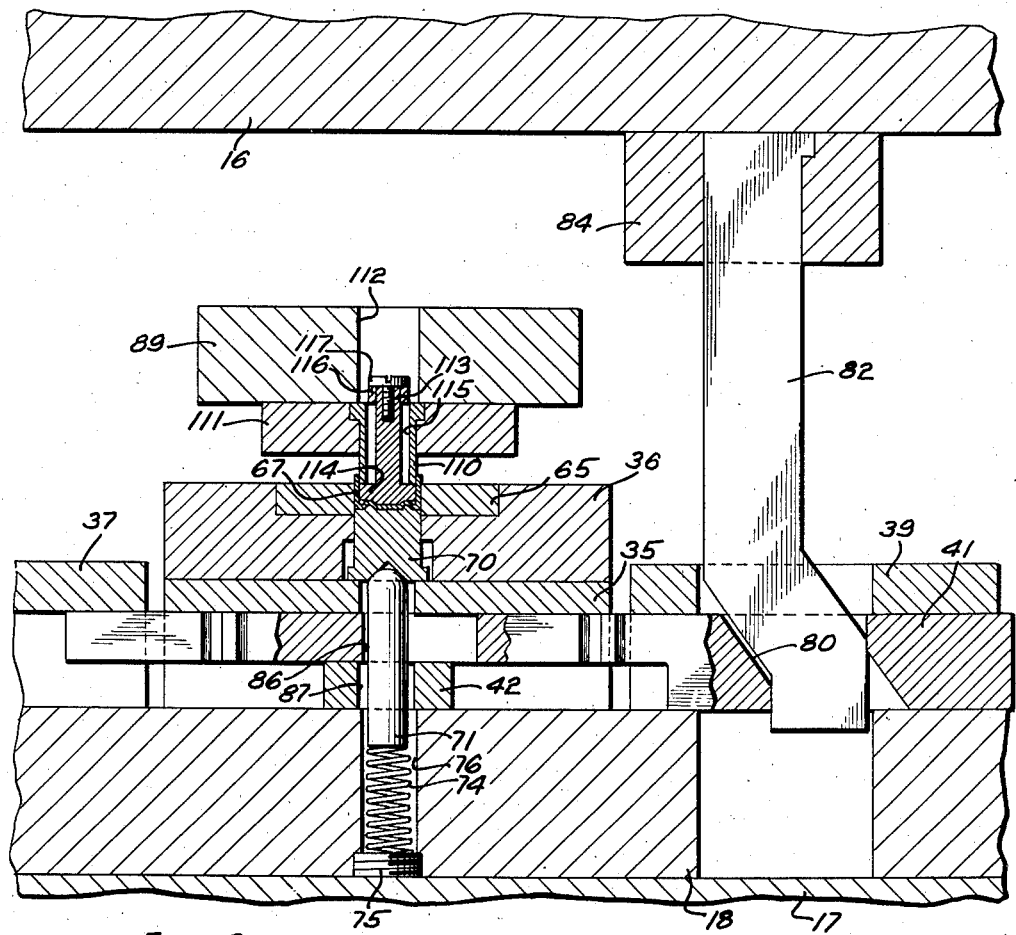
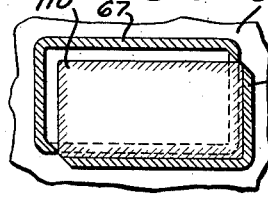
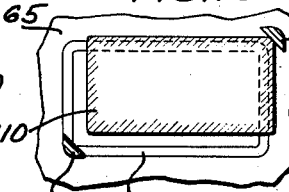
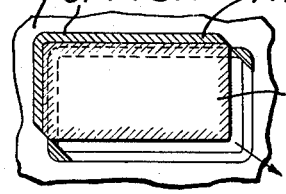
INVENTORS
A. S. LISS
A. M. MACPHEAT
BY Harry L. Dieft
ATTORNEY Patented Jan. 7, 1947

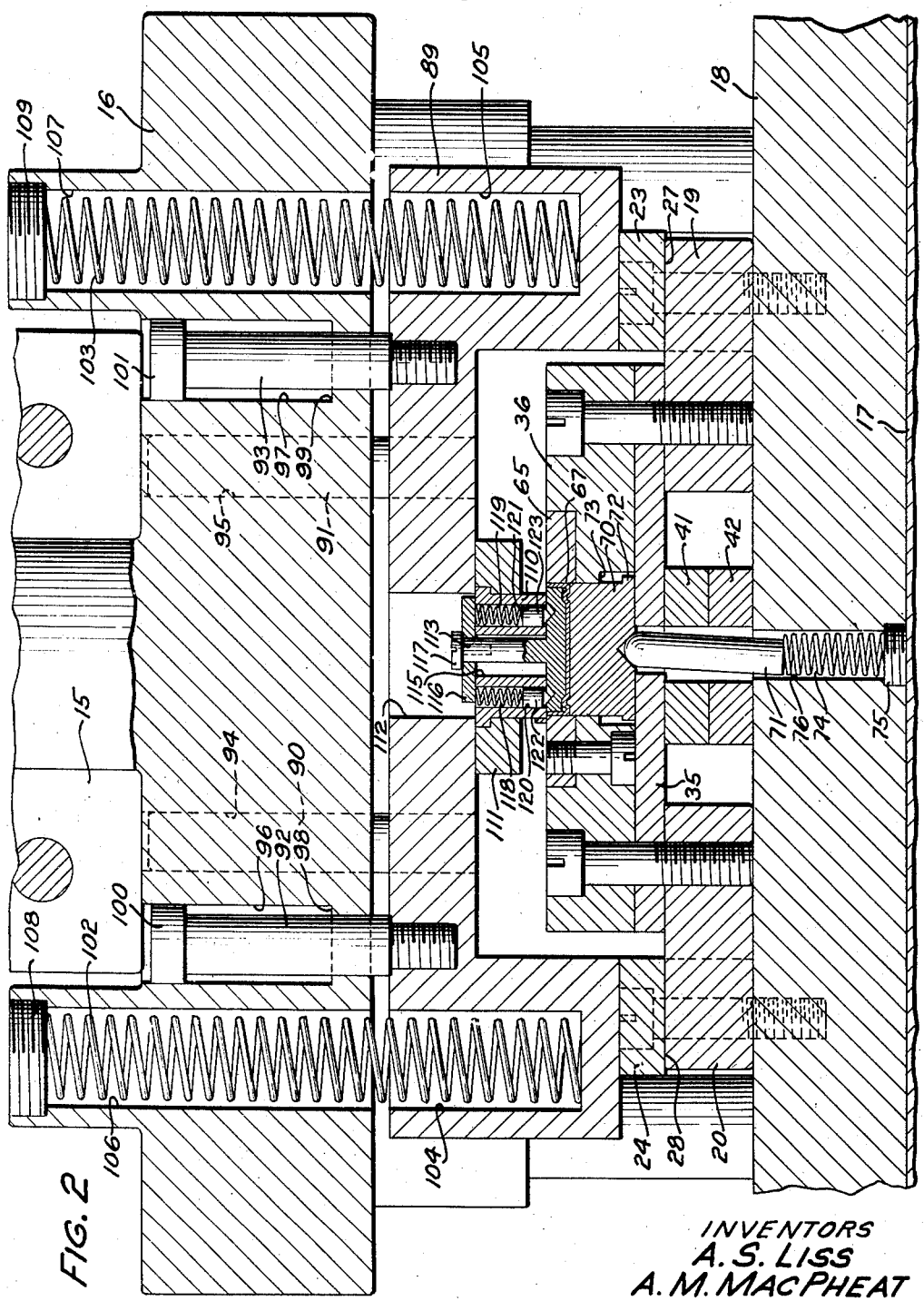

2,413,980

UNITED STATES PATENT OFFICE 2,413,980

SHEARING APPARATUS

August S. Liss, Chicago, and Alexander M. Mac-Pheat, Brookfield, Ill., assignors to Western Electric Company, Incorporated, New York, N. Y., a corporation of New York Application August 25, 1944, Serial No. 551,146

9 Claims. (Cl. 164—48)

This invention relates to shearing apparatus and more particularly to an apparatus for trimming the edges of drawn or extruded cans.

It is an object of the present invention to provide a simple apparatus for rapidly and accurately trimming articles.

In accordance with one embodiment of the invention, the head of a punch press is provided with a pair of camming members disposed at 90° one to another and adapted, upon reciprocation of the punch press, to impart reciprocatory motion to a pair of superposed camming slides mounted on a bed plate of the press and movable at right angles one to another. The slides are provided with suitable camming surfaces adapted to engage with and actuate a shiftable shearing die assembly, which will be shifted by the cams on the slides. When one of the slides is actuating the die plate, the other slide serves as a guide for the die assembly, which will move longitudinally of the slide which is acting as a guide. The head of the punch press carries a shearing member for cooperation with the shearing die assembly and on which a spacer conforming to the interior surface of the article is slidably mounted, whereby, when the shearing die assembly is moved by the slides, the article will be moved bodily in one plane to shear its edges between the shearing member on the head of the press and the shearing die assembly on the bed of the press.

A complete understanding of the invention may be had by reference to the following detailed description of one embodiment thereof when considered in conjunction with the accompanying drawings, wherein Fig. 1 is a plan section, partly broken away, showing the bed of a punch press equipped with tools made in accordance with the present invention and showing the press head actuated camming members and a pair of liner pins in section;

Fig. 2 is a vertical sectional view taken on line 2—2 of Fig. 1 through the press with the press head in its lowermost position;

Fig. 3 is a vertical sectional view taken substantially along the line 3—3 of Fig. 1 in the direction of the arrows showing the press head in its elevated position;

Fig. 4 is a fragmentary vertical sectional view taken substantially along the line 4—4 of Fig. 3 in the direction of the arrows showing details of the shearing member and shearing die assembly;

Fig. 5 is a perspective view in detail of an article to be trimmed;

Fig. 6 is a vertical sectional view taken substantially along the line 6—6 of Fig. 1 in the direction of the arrows and showing the press head in an intermediate position just prior to the position at which one of the camming members carried by it will actuate its associated slide;

Fig. 7 is a diagrammatic view showing the relationship of the assembly, the shearing member carried by the head of the press, and the guide or spacer member which enters the interior of the article to be sheared;

Figs. 8, 9, 10 and 11 are views similar to Fig. 7 showing the sucessive cuts formed by the cooperating shearing members when the shearing die assembly is shifted to its various positions.

Figure 1:
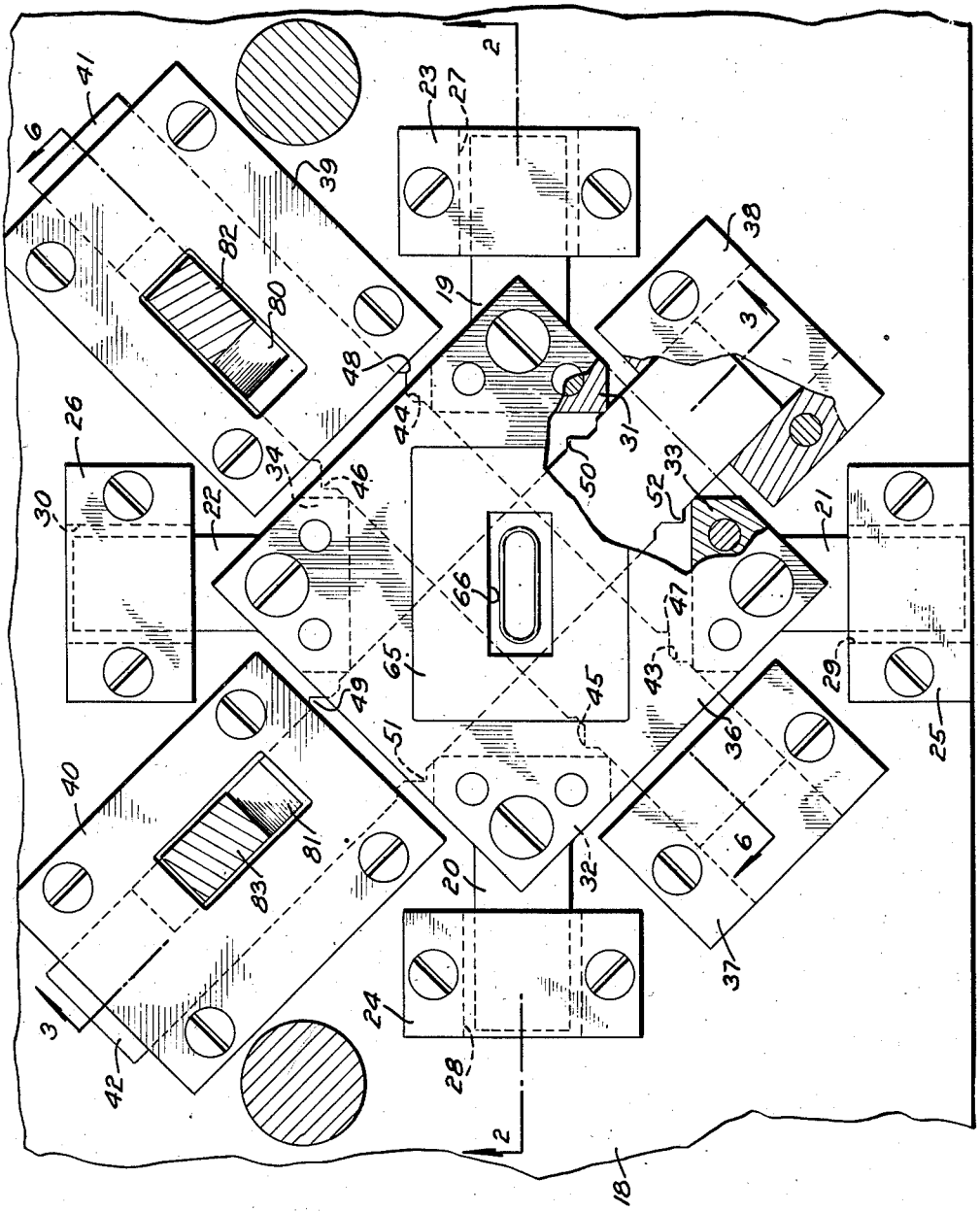

Referring to the drawings, wherein like reference characters designate the same parts throughout the several views, particular reference being first had to Fig. 2, it will be noted that the reciprocatory ram 15 of a punch press of usual design carries a tool supporting plate designated generally by the numeral 16 and that the bed 17 of the press carries a bolster plate 18, on which the various parts of the lower die and cooperating elements are mounted. Mounted directly upon the bolster 18 are four die block supports 19, 20, 21 and 22. These supports are slidable with respect to the bolster 18 and are held down thereon by means of brackets 23, 24, 25 and 26, which are fixed on the bolster 18 and are provided with openings 27, 28, 29 and 30 adapted to permit movement of the supports 19, 20, 21 and 22 within the openings. Formed integrally with the die block supports 19, 20, 21 and 22 are cam members 31, 32, 33 and 34. The die block supports serve to support a shedder retainer plate 35 and a die block 36, as seen most clearly in Figs. 2, 3 and 6.

From the foregoing, it will be apparent that the die block and its supports are movable upon the bolster 18, being held down on the bolster plate by the brackets 23, 24, 25 and 26 engaging the upper surfaces of the die block supports 19, 20, 21 and 22.

In addition to supporting the die block supports and their retainer brackets, the bolster 18 has four guide brackets 37, 38, 39 and 40 attached to it for receiving and guiding camming slides 41 and 42, the brackets 37 and 39 serving to guide the cam slide 41 for rectilinear motion and the guide brackets 38 and 40 serving to guide the camming slide 42 for rectilinear motion at right angles to the line of motion of the camming slide 41. The camming slides 41 and 42 may be reciprocated in their respective guide brackets, as will be described hereinafter, and when so moved, will carry camming projections formed on them into engagement with the cam members 31, 32, 33 and 34 on the die block supports 19, 20, 21 and 22, respectively, and will cause the supports 19, 20, 21 and 22 to be moved. The lower or right hand face of the camming slide 41, as viewed in Fig. 1, has a pair of notches 43 and 44 formed in it directly opposite camming projections 45 and 46, respectively, formed on the upper lefthand side of the slide 41. Therefore, when the slide 41 is moved downwardly to the left, as viewed in Fig. 1, camming projections 45 and 46 will engage a corner of the cam members 32 and 34, thus to move the die block 36 upwardly to the left, as viewed in Fig. 1, the die block being moved at 90° to the path of movement of the slide 41 due to the engagement of the sides of the slide 42 wtih the corners of the cam members 32 and 34. The camming slide 41, after moving the die block 36 upwardly to the left, will also move it downwardly to the right (Fig. 1) when the camming slide 41 is pushed downwardly to the left due to the provision on the camming slide 41 of camming projections 47 and 48 on the lower right hand side of the camming slide 41. Suitable notches are formed in the upper lefthand side of the camming slide 41 in the area thereof directly opposite the camming projections 47 and 48, thus to permit the camming projections 47 and 48 to be effective. The camming slide 42 is provided with camming projections 49 and 50 on its upper right hand side, as viewed in Fig. 1, and camming projections 51 and 52 on its lower lefthand side. These camming projections are similar to those provided on the camming slide 41 and will act upon the cam members 31 and 34 and 32 and 33 when camming slide 42 is moved downwardly to the right by mechanism to be described hereinafter.

The die block 36 has a shearing die 65 suitably mounted in it in which there is an aperture 66 conforming to the outside contour of an article 67 which is to have its upper edges trimmed, as illustrated in Fig. 5. The particular article disclosed herein comprises a portion of an electrical apparatus which is rectangular in shape and has an embossed internal ridge formed on its face. This article blank is formed by an extruding or drawing operation which, upon completion, leaves the article with a rough upper edge, as indicated by the numeral 68, which must be trimmed off at the position indicated by the dotted line 69. This trimming is performed in the apparatus comprising an embodiment of the present invention and, accordingly, the die contour is made to conform to the outside contour of the blank. Seated in the die aperture 66 and slidable therein is a shedder 70, the upper surface of which has a ridge formed in it to extend into the embossing formed in the body of the article in a previous operation. This shedder is normally urged upwardly to the position as shown in Fig. 3 by a spring-pressed pin 71, which urges the shedder up to a position where a shoulder 72 formed thereon will engage a cooperating shoulder 73 formed in the die block 36. The pin 71 is urged upwardly by a compression spring 74, which is compressed between the lower end of the pin and a plug 75 threaded into an aperture 76 in the bolster 18. The shedder 70, being urged upwardly by the pin 71, will thus serve to eject an article from the apparatus after it has been trimmed therein.

The camming slides 41 and 42 are provided with cam slots 80 and 81, with which cam members 82 and 83 are adapted to cooperate. Cam members 82 and 83 are suitably mounted upon the tool assembly 16, being seated in blocks 84 and 85 fixed to the underside of the tool assembly. The cam members 82 and 83, as shown most clearly in Figs. 6 and 3, respectively, reciprocate with the ram 15 and serve to move the camming slides 41 and 42 toward the center of the press on the down stroke of the ram 15 and serve to return the cam slides to their normal inoperative position, as shown in Figs. 3 and 6, upon the upstroke of the ram. In this manner, the camming slides 41 and 42 will be reciprocated at right angles one to another upon each stroke of the ram 15 and, in so moving, they will move the die block 36 at right angles to their path of movement. It should be noted at this time that the camming slides 41 and 42 are provided with slots 86 and 87 extending longitudinally of them to permit the pin 71 to extend through them and resiliently support the shedder 70. The aligned portion of the two slots 86 and 87 is in alignment with an aperture 88 formed in the stripper retainer plate 35.

In addition to supporting the cam members 82 and 83, the tool supporting plate 16 supports a die block 89, which is fixed against movement transversely of the tool supporting plate 16 by guide pins 90 and 91 and retainer screws 92 and 93. The guide pins 90 and 91 reciprocate in guide apertures 94 and 95, respectively, and the retainer screws 92 and 93 reciprocate in shouldered apertures 96 and 97 provided with shoulders 98 and 99, which are adapted to cooperate with head portions 100 and 101 on the screws 92 and 93 to prevent movement of the die block 89 beyond the position where the heads 100 and 101 engage the shoulders 98 and 99. The die block 89 is normally urged downwardly by compression springs 102 and 103 seated in sockets 104 and 105, respectively, formed in the die block and in apertures 106 and 107 formed in the tool supporting plate 16. The upper ends of the apertures 106 and 107 are closed by threaded plugs 108 and 109, against which the upper ends of the springs 102 and 103 abut.

From the foregoing, it is believed to be apparent that the die block 89 is normally urged downwardly away from the tool supporting plate 16 to a position where the heads 100 and 101 on retainer screws 92 and 93 will engage with shoulders 98 and 99 in the apertures 96 and 97. The portions of the die block 89, into which the springs 102 and 103 extend, comprise abutments which are adapted to engage the upper surface of the brackets 23 and 24, thereby to limit the downward movement of the die block 89 to properly position a shearing member 110 with respect to the shearing die 65. The shearing member 110 is mounted in retainer member 111 fixed to the underside of the block 89 and when moved to the position shown in Fig. 2, the shearing member 110 will be held stationary in that position during movements of the shearing die 65 to shear the article along the line 69, as indicated in Fig. 5. As shown most clearly in Fig. 4, the block 89 has a central aperture 112 formed in it for receiving an upwardly extending shank 113 of a clamping member 114. The shank 113 of the clamping member 114 extends through a central aperture 115 formed in the shearing member 110, which is large enough to permit the guide 114 to move transversely of the member 110. Encircling the upper end of the shank 113 is a plate 116, which is held against the upper side of the member 110 by a filister head machine screw 117 and threaded into the shank. This plate 116 serves as an abutment against which the upper ends of a pair of springs 118 and 119 mounted in apertures 120 and 121 in the shearing member 110 may bear. The springs 118 and 119 urged pointed centering pins 122 and 123 to engage in conical sockets 124 and 125, respectively, formed in the upper face of the guide member 114. By means of this construction, the guide member 114 is spring-urged to remain in the position shown in Fig. 4, but may be shifted upon movement of the shearing die 65, into which it will extend when the block 89 is in its lowermost position, as shown in Fig. 2. The guide member 114 thus serves as a mandrel or support for the inside of the article being trimmed between the shearing surfaces of the shearing die 65 and shearing member 110.

A more complete understanding of the invention may be had by reference to the following brief description of the mode of operation of the apparatus in shearing the rough edges from an article. In the operation of the apparatus, an article as formed in Fig. 5 may be placed on the shedder 70, the upper surface of which conforms to the bottom surface of the article, and, thereupon, the punch press may be driven through a complete cycle of operation to move the ram 15 downwardly from the position shown in Fig. 3 to the position shown in Fig. 2 and then back to its originally retracted position. As the ram moves downwardly, the guide member 114 will enter the article and force it and the shedder 70 downwardly until the article nests in the aperture in the shearing die 65 with its rough edge to be sheared off extending up above the lower surface of the shearing member 110. As soon as the article is nested in the shearing die 65, continued downward movement of the ram 15 will cause the cam 82 to engage and actuate the camming slide 41 after the block 89 has come to rest on the upper surfaces of the brackets 23 and 24, thus to prevent further downward movement of the block 89 and parts carried by it. The springs 102 and 103 will then be compressed as the ram and tool supporting plate 16 continue their downward movement. When the cam member 82 engages the camming slide 41, it will shift the slide 41 to the left, as viewed in Fig. 6, thereby to move the die block 36 and shearing die 65 carried thereby upward and to the left at a 45° angle, as viewed in Fig. 8. Since the shearing member 110 is held stationary at this time, the movement of the shearing die 65 from the position shown in Fig. 7 to the position shown in Fig. 8, as indicated by the arrow in Fig. 8, will cause the portion designated 140 to be sheared from the upper rim of the article 67, the guide member 114 moving with the shearing die 65. Continued downward movement of the ram 15 will cause the camming projection 48 to engage the cam member 31 and, accordingly, the die block 36 will be shifted at right angles to the path of movement of the camming slide 41, thus to shear off the edge portion of the article 67, as indicated by the numeral 141 in Fig. 9, the movement of the die 65 being in the direction indicated by the arrow in Fig. 9. After the cam member 82 has completed its camming action in shifting the camming slide 41 to the left (Fig. 6), the cam member 83 will engage the cam surface 81 on the camming slide 42, as shown in Fig. 3, and will, therefore, shift the camming slide 42 to the right (Fig. 3). As the camming slide 42 is shifted to the right, as shown in Fig. 3, (downwardly to the right, as shown in Fig. 1), camming projections 52 and 50 will successively engage cam members 33 and 34 to impart movement to the die 65 downwardly to the left and then upwardly to the right, as illustrated in Figs. 10 and 11, thus to cut off the two corner pieces designated 142 and 143, respectively. It should be noted that when the shearing die 65, and the die block 36 which carries it, are moved by the camming slide 41, the side edges of the slide 42 serve as a guide for the die block and restrict its movement to a path exactly at right angles to the path of movement of the slide 41. Similarly, when the slide 42, through its camming projections 49, 50, 51 and 52, serves to shift the die block 36, the die block will be restricted to a path of travel exactly at right angles to the path of travel of the slide 42 due to the engagement of the cam members 31, 32, 33 and 34 with the side edges of the camming slide 41. Thus, in the operation of the present invention, the movable shearing die, in performing its shearing operation, moves in one plane to complete its shearing operations. After the article 67 has had the rough edges trimmed from it, the ram 15, in moving upwardly, will restore the camming slides 41 and 42 to their original position, thus resulting in further actuation of the die block 36. However, these movements of the die block 36 are without any effect since the edges have already been sheared from the article and as the ram continues to move upwardly, it will retract the guide member 114 from the article which will be stripped from the die 65 by the shedder 70 being moved upwardly by its pin 71 under the influence of the spring 74.

What is claimed is:

1. In a trimming apparatus, a shearing die assembly, means for slidably supporting the die assembly for movement in directions at an angle one to another in a common plane, a shearing member movable into operative association with said die assembly, camming slides alternately actuatable for actuating the die assembly, means on each of said camming slides for guiding the die assembly when the other camming slide is actuating the die assembly, and means for reciprocating said camming slides alternately.

2. In a trimming apparatus, a shearing die assembly, means for slidably supporting the die assembly for movement in directions at an angle one to another in a common plane, a shearing member movable into operative association with said die assembly, separately movable camming slides for actuating the die assembly, means on each of said camming slides for guiding the die assembly when the other camming slide is actuating the die assembly, and means for reciprocating said camming slides.

3. In a shearing apparatus, a shearing die assembly, means for supporting said die assembly for movement in a single plane, a shearing member movable to position to cooperate with said die assembly, a pair of camming slides for actuating said die assembly, each of said slides being movable with respect to said assembly, means on each of said camming slides for guiding the die assembly when the other camming slide is actuating the die assembly, and means for reciprocating said camming slides.

4. The combination of a punch press having a reciprocable ram and a stationary bed with a die assembly slidably mounted with respect to said bed, a shearing member guided by the ram for cooperation with said die assembly, cam means on said ram, a pair of camming slides movable at right angles one to the other for actuation by said cam means, and means fixed to said die assembly for engagement by the cam slides to actuate the die assembly.

5. The combination of a punch press having a reciprocable ram and a stationary bed with a die assembly slidably mounted with respect to said bed, a shearing member guided by the ram for cooperation with said die assembly, cam means on said ram, a pair of camming slides movable at right angles one to the other positioned for actuation by said cam means, and means fixed to said die assembly for engagement by the cam slides to actuate the die assembly, each of said camming slides having surfaces for guiding the die assembly when the other camming slide is actuating the die assembly.

6. In a shearing apparatus, a shearing die assembly, means for supporting said die assembly for movement in a single plane, a shearing member, means for moving the shearing member into position to cooperate with said die assembly, a pair of separately movable camming slides for actuating the die assembly, means on each of said slides for guiding the die assembly when the other slide is actuating the die assembly, and means on the means for moving the shearing die for actuating said slides.

7. In an apparatus for trimming articles, a shearing member, means for moving said shearing member to a shearing position, a shearing die for cooperation with said shearing member, and means for reciprocating said shearing die comprising a pair of separately movable camming slides movable at right angles one to the other, and means on said moving means for actuating the camming means.

8. In an apparatus for trimming articles, a shearing member, means for moving said shearing member to a shearing position, a shearing die for cooperation with said shearing member, and means for reciprocating said shearing die comprising a pair of separately movable camming means movable relative one to the other, and means on the moving means for actuating said camming means.

9. In an apparatus for trimming articles, a shearing member, means for moving said shearing member to a shearing position, a shearing die for cooperation with said shearing member, and means for reciprocating said shearing die comprising a pair of camming means movable relative one to the other, means on the moving means for actuating said camming means, and surfaces on each of said camming means for guiding the other camming means.

AUGUST S. LISS.
ALEXANDER M. MacPHEAT.